United States Patent

Patrick et al.

[11] Patent Number: 5,537,098
[45] Date of Patent: Jul. 16, 1996

[54] SIGNALING FREQUENCY DETECTION FOR A COMMUNICATIONS NETWORK

[75] Inventors: Michael W. Patrick, Assonet; James A. Daly, Chelsea, both of Mass.

[73] Assignee: Digital Equipment Corporation, Maynard, Mass.

[21] Appl. No.: 406,261

[22] Filed: Mar. 16, 1995

Related U.S. Application Data

[63] Continuation of Ser. No. 48,167, Apr. 14, 1993, abandoned.

[51] Int. Cl.$^6$ ............................ H04Q 3/00; G05B 13/00; H04J 3/14
[52] U.S. Cl. ........................ 340/825.050; 370/85.15; 364/148
[58] Field of Search .................. 340/825.05; 370/1611, 370/85.5, 85.1, 85.15; 364/131, 148, 149, DIG. 1; 395/200.12, 200.19, 200.20

[56] References Cited

U.S. PATENT DOCUMENTS

| | | | |
|---|---|---|---|
| 5,081,641 | 1/1992 | Kotzin et al. | 370/85.1 |
| 5,103,446 | 4/1992 | Fischer | 370/85.1 |
| 5,208,742 | 5/1993 | Warn | 364/131 |
| 5,291,390 | 3/1994 | Satou | 364/148 |
| 5,311,515 | 5/1994 | Henderson et al. | 370/85.1 |

*Primary Examiner*—Alyssa H. Bowler
*Assistant Examiner*—Mark H. Rinehart
*Attorney, Agent, or Firm*—Dirk Brinkman; Ronald Hudgens; Arthur Fisher

[57] ABSTRACT

An apparatus is provided for detecting the signaling frequency of communications signals transported on the trunk and lobe circuits of a token ring. The communications signals including Differentially Manchester Encoded data signals. The apparatus includes an internal trunk circuit and a plurality of ports including an input port for connecting to an input trunk segment, and an output port for connecting to an output trunk segment, and a plurality of lobe ports for connecting to the lobe circuits. Means are provided for sensing the frequency of the data signals at each of said plurality of ports. The sensing means including means for taking multiple successive timing samples, and grouping the samples into quality groups.

11 Claims, 9 Drawing Sheets

| RULE | INPUTS | | | OUTPUT |
|---|---|---|---|---|
| | L_AWE | L_PC_IN | L_SPEED | L_TCU_OUT |
| L_1 | X | X | 0 | WRAP |
| L_2 | 0 | X | 1 | INSERT |
| L_3 | 1 | 0 | 1 | WRAP |
| L_4 | 1 | 1 | 1 | INSERT |
| | 401 | 402 | 403 | 404 |

FIG. 9

|  | INPUTS | | | | OUTPUT |
| --- | --- | --- | --- | --- | --- |
| RULE | RO_AWE | RO_PC_IN | RO_SPEED | RO_TCU_IN | RO_TCU_OUT |
| RO_1 | 0 | X | 0 | WRAP | WRAP |
| RO_2 | 0 | X | 0 | INSERT | INSERT |
| RO_3 | 0 | X | 1 | X | INSERT |
| RO_4 | 1 | 0 | X | X | WRAP |
| RO_5 | 1 | 1 | 0 | WRAP | WRAP |
| RO_6 | 1 | 1 | 0 | INSERT | INSERT |
| RO_7 | 1 | 1 | 1 | X | INSERT |
|  | 301 | 302 | 303 | 304 | 305 |

FIG.11

| RULE | INPUTS | | | | OUTPUTS | |
|---|---|---|---|---|---|---|
| | RI_AWE | MAU | RI_PC_IN | RI_SPEED | RI_TCU_OUT | RI_PC_OUT |
| RI_1 | 0 | X | X | 0 | WRAP | 0 |
| RI_2 | 0 | X | X | 1 | INSERT | 0 |
| RI_3 | 1 | 0 | X | X | WRAP | 0 |
| RI_4 | 1 | 1 | 0 | X | WRAP | 1 |
| RI_5 | 1 | 1 | 1 | 0 | WRAP | 1 |
| RI_6 | 1 | 1 | 1 | 1 | INSERT | 1 |

FIG. 13

SIGNALING FREQUENCY DETECTION FOR A COMMUNICATIONS NETWORK

This application is a continuation of Ser. No. 8,167 filed Apr. 14, 1993, now abandoned.

FIELD OF THE INVENTION

This invention relates generally to communications networks, and more particularly to signaling frequencies of a ring network having wiring concentrators.

BACKGROUND OF THE INVENTION

Nodes are defined as intelligent data terminal equipment (DTE), such as terminals, PCs, work-stations, computers, and servers. Nodes can transmit and receive communications signals. A network is defined as a group of nodes joined together by a communications medium for transporting the communications signals. In a network context, nodes are sometimes referred to as end-stations. An end-station generally does not have the capability to expand the network.

One type of network is a token ring. Usually, a token ring is assumed to be a baseband ring specified by the "Token Ring Access Method and Physical Layer Specification," ANSI/IEEE 802.5-1992 (ISI DP 8802/5) standard, hereinafter the "802.5 standard". However, token rings can be applied to a number of different network topologies and access methods.

Although token rings can come in any number of physical and logical arrangements, token rings generally include a closed loop or main ring, generally known as backbone or trunk circuit (trunk), made of a one or more ring segments of the communications medium. The medium may be conductive wires configured as, for example, twisted pairs, co-axial cable, or fiber optical cable, micro-wave links, and the like.

In order to facilitate the construction of ring networks, secondary, or internal rings may be provided. Typically, a wiring concentrator or Multi-station Access Unit (MAU) provides for the connection of several nodes at a single trunk location, or wiring center, for example a communications closet in an office building. The nodes of a network are connected to the MAU via tertiary rings circuits usually known as lobe circuits (lobes). In other words, lobes provide the communications link between nodes and MAUs, and the ring segments of the trunk are the communications link which connects MAUs.

A MAU usually includes a plurality of ports for physically connecting the lobe cables. A Ring In (RI) port and a Ring Out (RO) port are also provided for connecting to the ring segments of the trunk. Connections between the lobes and the trunk inside the MAU are usually provided by means of a trunk coupling units (TCU).

It is a problem to arrange the configuration of the network without disrupting the operation of the network. The prior art has provided various devices for constructing a network, however, they are generally difficult to adjust in number or location once the network is installed in a physical environment such as an office building.

It is a problem establishing and maintaining appropriate data signaling frequencies or "speeds" on the communications network. In known ring networks, information may be communicated among the nodes at varying frequencies or speeds, for example 4, or 16 megabytes per second (Mb/sec). It is a problem to initially establish an optimal signaling speed on the network as the network is activated, for example, during power-up, or after a network failure. Also, once a ring becomes operational, it is a problem to maintain the optimal signaling speed as the network is re-arranged, or when dormant components start communicating on the network.

Prior art networks typically require operator intervention to ensure network integrity due to data signaling speed variations. However, in most prior art networks, attempts to insert components, such as MAUs, which are configured to communicate at different frequencies or speeds will generally cause the network to crash.

SUMMARY OF THE INVENTION

An apparatus is provided for detecting the signaling frequency of communications signals transported on the trunk and lobe circuits of a token ring. The communications signals including Differentially Manchester Encoded data signals. The apparatus includes an internal trunk circuit and a plurality of ports including an input port for connecting to an input trunk segment, and an output port for connecting to an output trunk segment, and a plurality of lobe ports for connecting to the lobe circuits. Means are provided for sensing the frequency of the data signals at each of said plurality of ports. The sensing means including means for taking multiple successive timing samples, and grouping the samples into quality groups. The quality groups can include valid and invalid frequency samples. The samples are valid if the communications signals are within predetermined frequency ranges, and the samples are invalid if the communications signals are outside of the predetermined frequency ranges.

BRIEF DESCRIPTION OF THE DRAWINGS

FIG. 9 shows the rules for transitioning the lobe state machine;

FIG. 11 shows the rules for transitioning the Ring Out state machine;

FIG. 13 shows the rules for transitioning the Ring In state machine.

DETAILED DESCRIPTION OF THE PREFERRED EMBODIMENT

Figure 1:
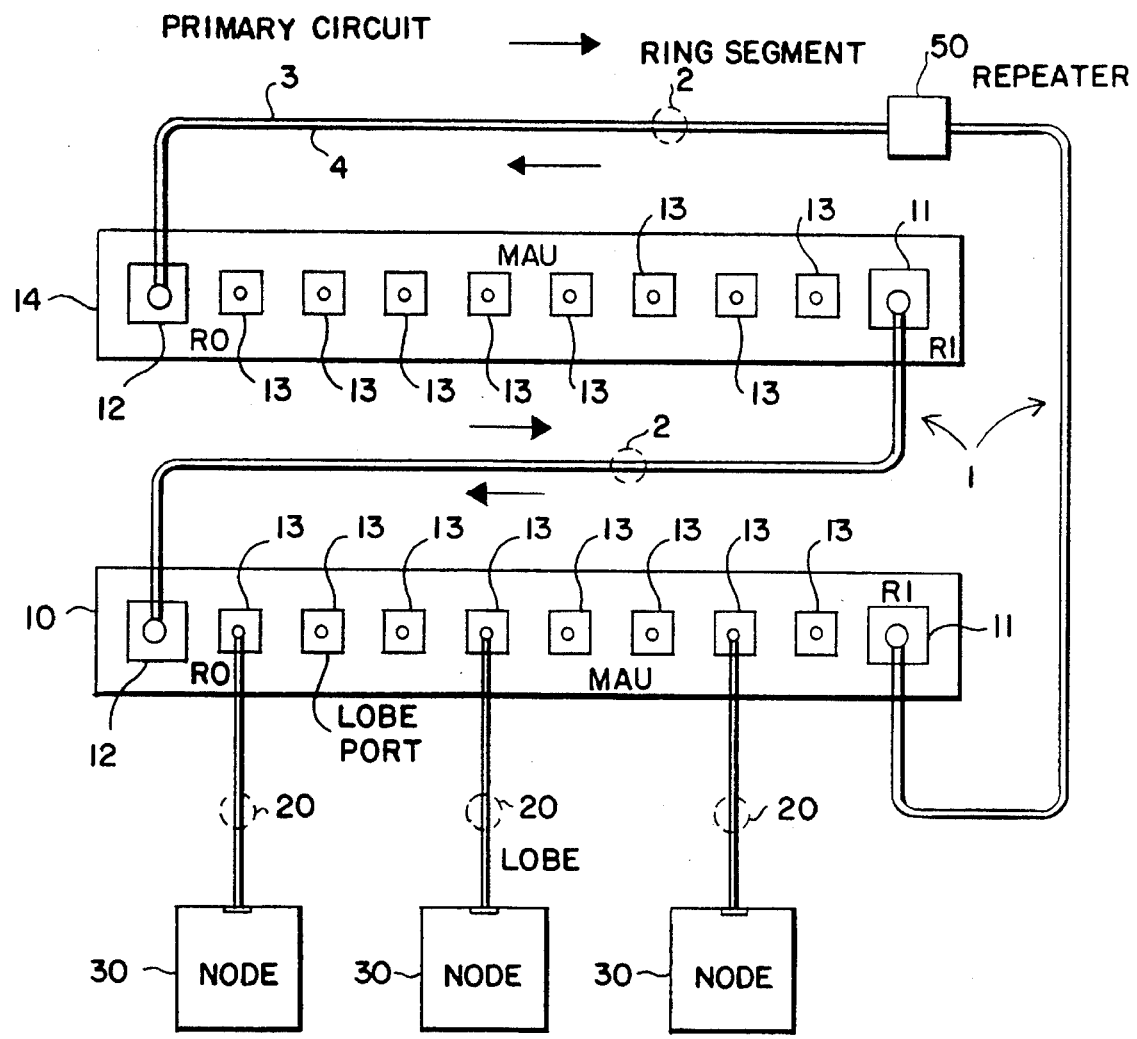
FIG. 1 is a block diagram of a token ring network.

FIG. 1 shows an arrangement of a communications network in the form of a local area network (LAN). The arrangement includes a trunk circuit (trunk) 1 having ring segments 2 for connecting wiring concentrators (Multi-station Access Units, or MAUs) 10 and 14. Connected to the MAU 10, via lobe circuits (lobes) 20, are end-stations, or nodes 30. The nodes 30 can include DTE such as terminals, PCs, workstations, computers, servers, and the like. The nodes 30 transmit and receive communications signals which are transported on the communications medium, e.g., the trunk 1 and lobes 20. This type of arrangement allows for what is known as star wiring in a physical environment, for example, an office building.

Although, the invention is described in context of a LAN such as a ring communications network, this should not be construed as a limitation on the scope of the invention, since it is intended that the arrangement disclosed herein can also be used for other types of ring and non-ring communications networks, local and wide area. Configurations of ring communications networks are well defined, see for example the IEEE 802.5 standard.

Each ring segment 2 and lobe 20 is made of a communications medium, for example, pair 3 and pair 4 of twisted conductive wires to provide essentially two physically independent ring circuits. Each of the pair 3 and pair 4 can be either shielded (STP) or unshielded (UTP). Each pair 3 and pair 4 transports *carries the communications signals, which can include, for example, differentially coupled data signals. The data signals are, for example, high frequency digital pulses. One pair, for example, the pair 3 serves as the primary circuit, while the other pair 4 serves as a back-up circuit in case of a failure of the primary circuit on the pair 3. The communications signals can also include timing and control signals which will be described in further detail herein.

However, the communications medium is chosen only as a means of describing the present invention. It is well within the skill of the art to use other communication media, for example co-axial cables, fiber optical cables, micro-wave links, and the like, without deviating from the scope or spirit of the present invention.

It should be obvious that the arrangement shown in FIG. 1 can be expanded to include other rings. It should also be apparent that the exact network configuration can vary over time as network components, such as ring segments, MAUs and nodes are physically added and removed, or logically isolated due to failures.

Rings can be expanded to a greater geographical area by the use of repeaters, for example the repeater 50 shown in FIG. 1. The repeater 50 is placed on the communications medium media to amplify and recondition the communications signals so that they may be communicated a greater distance. For example, in a token ring network, a repeater is typically required to transport the communications signals a distances greater than 100 meters.

Information is communicated over the network as high frequency data signals. The data signals circulates unidirectional, for example clockwise on the pair 3, and counter-clockwise on the pair 4, as generally indicated by the directed arrows in the Figures.

For the purpose of this discussion, the operation of the network will be described with reference to the primary ring, e.g., pair 3. On the primary ring, that is pair 3, the network components located in a relative clock-wise signaling direction are generally referred to as being "down-stream," and components located in a relative counter clock-wise direction are deemed to be "upstream."

The connections between adjacent ring segments 2 and lobes 20 are provided by communication ports of the MAUs 10 and 14. Each MAU includes a Ring In (RI) port 11 for connecting to network components located upstream, and a Ring Out (RO) port 12 for connecting to downstream network components.

It should be noted that a ring communications network can be configured by connecting the RO port 12 directly to the RI port 11 of the same MAU. Each MAU 10 and 14 also includes a plurality of, for example eight, lobe ports 13 for physically connecting the lobes 20. Connected to the lobes 20 are the nodes 30.

The 802.5 standard specifies that a Medium Interface Connector (MIC) be used for connecting to the communications media, i.e., the ring segments 2 or the lobes 20 at the ports 10–13. Two types of MICs are generally known, a data connector, anti an RJ45 connector (RJ45).

The data connector is a hermaphroditic self-shorting connector which serves both as a male plug and a female receptacle by simply rotating the data connector 180 degrees. While a matching data connector is not plugged in at a port, the pins of the data connector normally provide a self-shorting or "closed" circuit to maintain ring signaling continuity.

RJ45 connectors have separate male plugs and female receptacles. While an RJ45 plug is not mated with an RJ45 receptacle the RJ45 pins normally are an open circuit, interrupting ring signaling continuity.

For reasons that will be described, known MAUs generally use data connectors for the RI/RO ports 11–12, and RJ45 connectors for the lobe ports 13. Prior art concentrators that do use RJ45s connectors at the trunk ports, usually include a manual switch to enable circuits which simulate the self-shorting features as described for the data connectors, upon removal.

It would be an advantage to allow for the use of compact low-cost RJ45 connectors for all medium connections at the ports 11–13, without having to tediously set and reset switches to simulate data connector functionality every time the concentrator is turned OFF or ON or when a trunk segment or lobe is disconnected form the MAU.

According to the 802.5 standard, nodes which are physically connected to a MAU via cables and connectors, are not allowed to actively communicate on the network unless they are "inserted." Nodes not inserted are said to be de-inserted, isolated, by-passed, or "wrapped". The mechanism for effecting the insertion and wrapping of nodes is a trunk coupling unit (TCU). That is, there is one TCU interface between the trunk 1 and each node 30 of the network. The TCUs are typically located in the MAU. The configuration and operation of a TCU is well known, and described in detail in the 802.5 standard.

In summary, a node inserts itself onto the communications network by driving a control signal into the TCU over the same physical media as is used for data signaling, i.e. the lobe 20. The control signal, typically an elevated D.C. current nominally in the range of 3.5–7.0 volts, is transparent to the high frequency data signals carried on the same physical media, hence, the TCU control signal is generally known as a "phantom current."

The 802.5 standard illustrates relays for effecting the switching action of the TCU to insert nodes. Typically, a latching relay is used because the phantom current is insufficient to continuously power the relay. Coils used for switching the relay are usually energized by charges stored in capacitors coupled to the relay. Circuits which detect the presence and absence of the phantom current cause the capacitors to discharge through the relay coils to switch the relays of the TCU.

Figure 2:
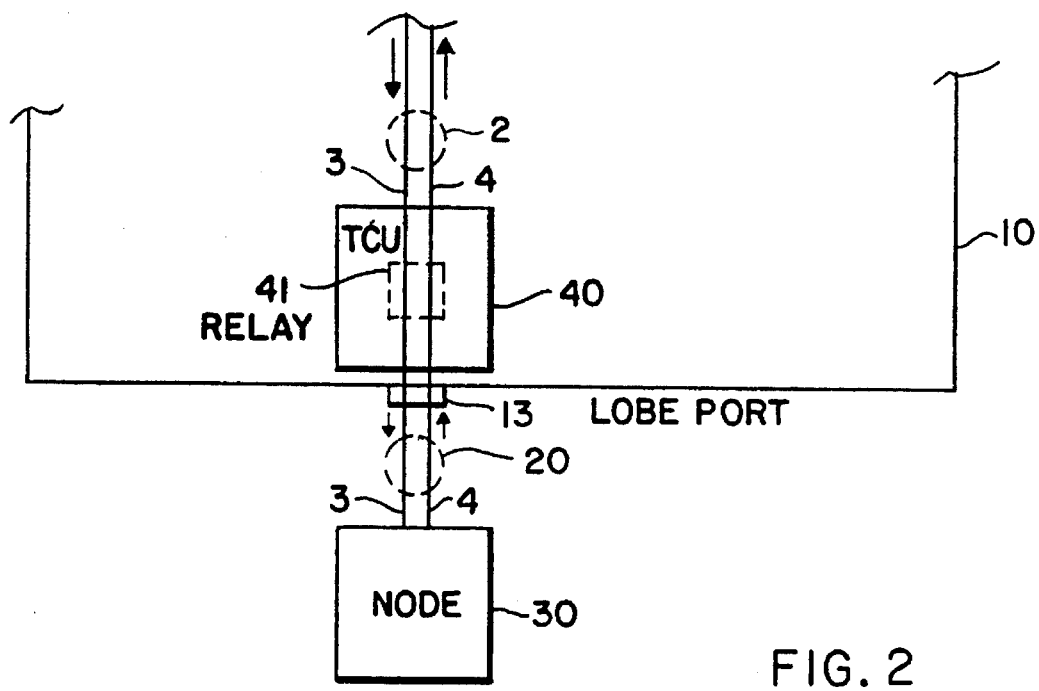
FIG. 2 is a block diagram showing a trunk coupling unit (TCU) having an inserted state.

FIG. 2, in simplified form, shows a TCU 40 having a relay 41 in an "inserted" state. That is, the node 30 is driving the phantom current via the lobe 20 into the TCU 40. The presence of the phantom current causes the contacts of the relay 41 to close. While the contacts of the relay 41 are closed, the communications signals can pass through the TCU 40 permitting the node 30 to communicate over the network via the pair 3 or the pair 4 of the ring segment 2.

Figure 3:
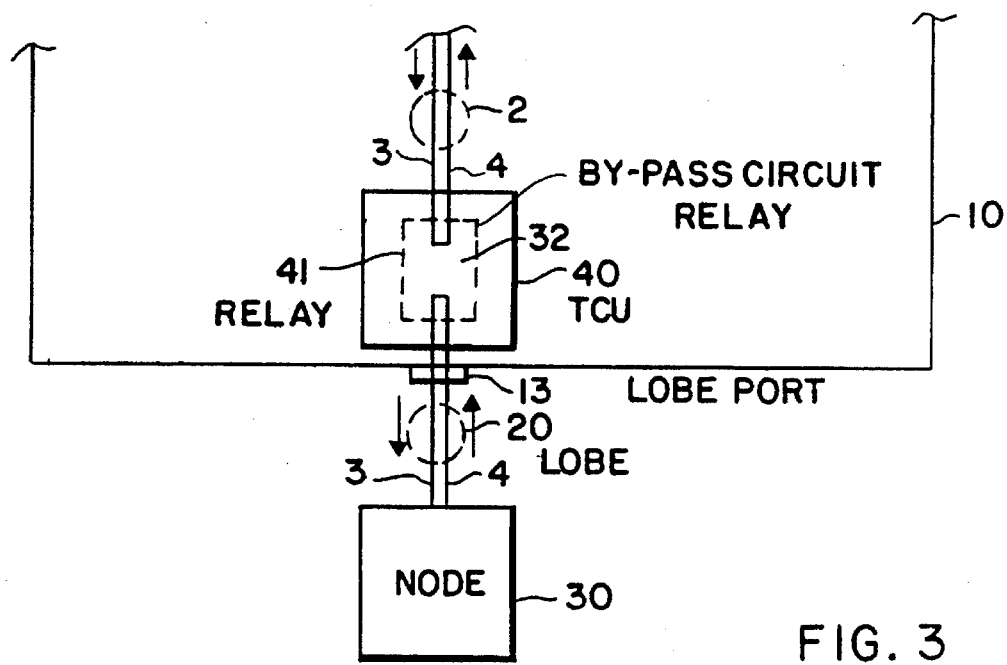
FIG. 3 is block diagram showing a TCU having a wrapped state.

Cessation of the phantom current on the lobe 20, as shown in FIG. 3, opens the contacts of the relay 41 to place the TCU 40 in a by-pass or "wrapped" state. When the TCU 40 is wrapped the node 1 is isolated from the trunk 1. Continuity on the trunk 1 and the lobe 20 is provided by looping the pairs 3–4 and the lobe 20 back onto themselves via by-pass circuits 32. Note that the by-pass circuits 32 provide ring and lobe continuity, and that the lobe 20 may be used for self-testing functions by the node 30.

Because the MAU, according to the 802.5 standard, must be configured with TCUs to detect the presence and absence of phantom currents on the lobe ports 13, RJ45s may be used as the connectors at the lobe port 13. Thus, if a node is unplugged at the lobe port 13, the absence of phantom current automatically places the corresponding TCU in the wrapped state, to isolate the unplugged node while network continuity is maintained on the trunk.

However, the 802.5 standard does not provide for phantom current signaling on the trunk. Therefore, prior art MAUs generally do not include TCUs at the RI and RO ports. For this reason, prior art MAUs usually require the use of more complex and expensive data connectors at the RO and RI ports 11–12 to mimic the functionality of the TCUs.

Furthermore, the use of data connectors at the RI and RO ports imposes the additional burden of manual intervention to rearrange the network should a MAU fail internally so that it can no longer provide ring continuity. This is so because the data connectors are not sensitive to internal MAU failures. The failed MAU is isolated from the loop by manually disconnecting data connectors at the RI and RO ports.

Nor do prior art MAUs generally provide for the intelligent control of TCUs. The TCUs of prior art "dumb" MAUs usually slavishly follow the phantom current to insert and wrap TCUs. Thus, with prior art MAUs, other signaling conditions or states, which should be recognized and which in certain situations should influence the state of the TCUs, are generally ignored.

These, and other problems are addressed by providing the communications signals on the trunk with a control signal in the form of a trunk phantom current for configuration control of the communications network.

Another set of problems relate to the proper management of data signaling frequency or speed on the network. Although the 802.5 standard provides for various frequencies at which data signals can be communicated, for example 4, or 16 megabytes per second (Mb/sec), no guidelines are given on how the network frequency should optimally be determined, or how to handle the situation where a network component signaling at one frequency is connected via the communications medium to another network component signaling at different frequency. Indeed, prior art networks generally "crash" the ring, preventing proper ring operation at any frequency.

In addition, as a communications ring is activated after, for example, a power-up or failure, various delays are intrinsic in the activation process due to the staggered activation of the individual network components. This is particularly true in a network constructed with components made by a number of different manufacturers. Such delays may result in subtle timing problems and unstable signaling conditions or states generally not discerned by prior art network components.

In addition, a common reason for ring failure is an attempt to interconnect rings having components signaling data at different frequencies. Inserting a node or dumb MAU which has an incompatible signaling frequency or speed onto the trunk can make the entire network unfit for its intended purpose, Corrective action generally requires costly manual intervention to remove the offending wrong-speed component.

It would also be an advantage to permit the automatic adjustment of network signaling speed as components are added or deleted, or as the network topology changes.

These, and other problems are solved by a "smart" wiring concentrator or MAU including a controller for intelligently determining the states of the TCUs of the concentrator. The smart concentrator also provides for trunk phantom current signaling to permit the use of less costly and compact RJ45 connectors at the RI/RO ports 11–12. In addition, the smart concentrator as disclosed herein, can provides for the re-arrangement of the network without manual intervention.

The smart concentrator can detect and arbitrate other network signaling conditions or states, such as, for example network signaling speed, to improve network reliability and performance. Although the invention is described in context of a network concentrator, such as a Multi-Station Access unit, this should not be construed as limitation on the scope of the invention, since it is intended that the mechanisms disclosed can also be used for other types of network components such as repeaters, hubs, bridges, and the like.

Figure 4:
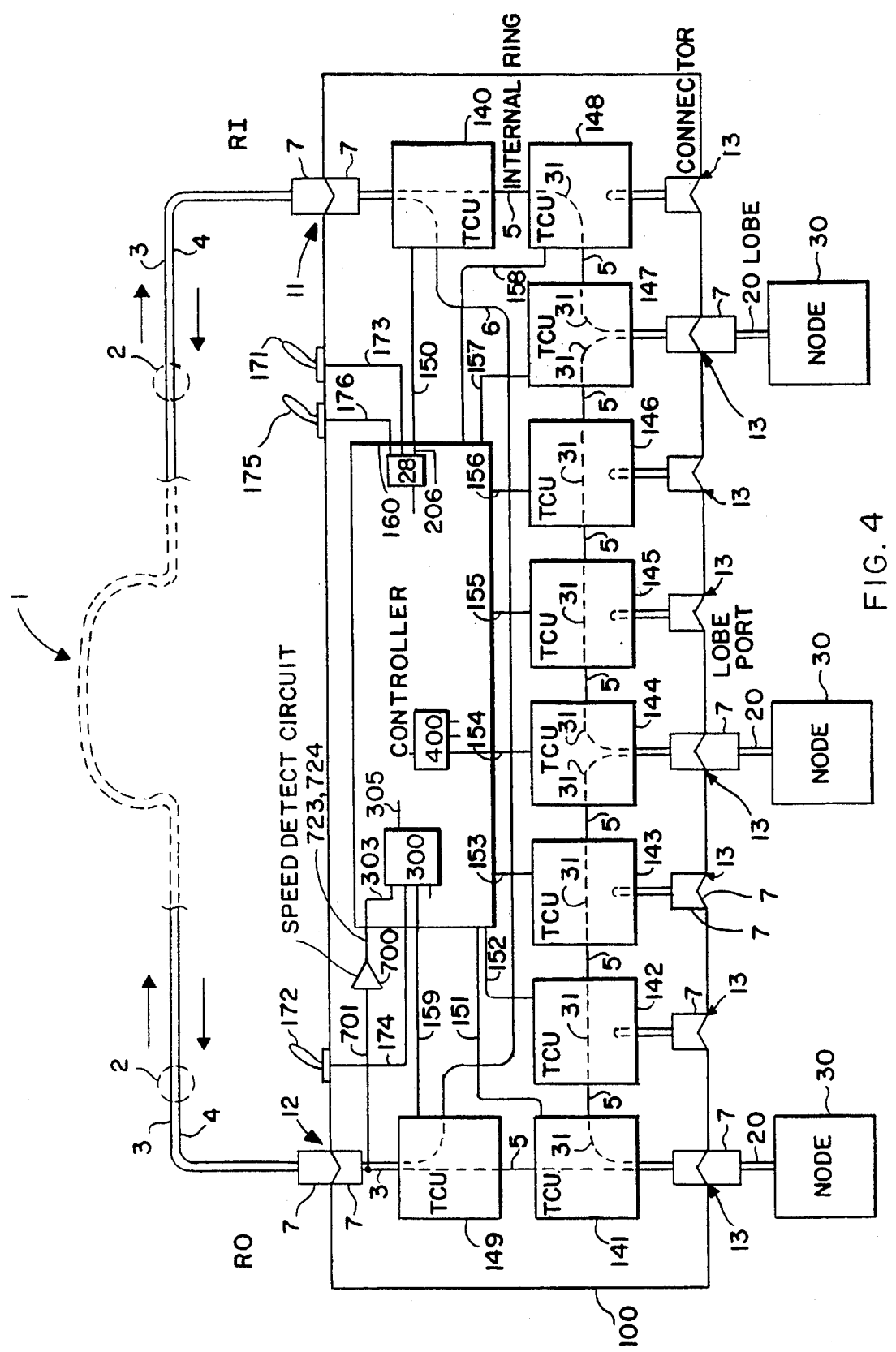
FIG. 4 is a block diagram showing a multi-station access unit (MAU) in a network arrangement.

FIG. 4 shows a smart MAU 100 having a RO port 12 and a RI port 11 connected to ring segments 2. End-stations 30 are connected via lobes 30 to lobe ports 13. The connectors for connecting the communications medium at the ports are generally indicated by reference numerals 7.

Connected to the lobe port 13 are the TCUs 141–148. In addition, the MAU 100 includes TCUs 140 and 149 connected to the RI/RO ports 11–12, respectively. The TCUs 140–149 comply with the 802.5 standard for making trunk cable connections. However, in addition, the TCUs 140–149 are switched under the control of a MAU controller 160. The controller 160, which will be described in detail herein, includes a plurality of state machines for switching the TCUs 140–149 according to a prescribed set of rules.

The TCUs 140–149 are internally connected to an internal trunk via internal ring segment 5–6. The dashed lines 31 generally show the continuity of the ring signal paths inside the TCUs 140–149. Note, for example, TCU 153 is in a wrapped state and TCU 144 is inserted in an inserted state.

Each of the TCUs 140–149 is connected to a MAU controller 160, via lines 151–159 respectively. The MAU controller 160 receives input signals for indicating a current state of the TCUs, and for indicating the conditions or states of the communications signals presented to the TCUs over the network.

The controller 160 also receives inputs from speed detect circuits (SDC) for determining the speed of the data signals presented at the ports 11–13. For clarity, only a single SDC 700 connected to the pair 3 at the port 12 is shown in FIG. 4 It should be understood there is a SDC 700 for each the pairs at all of the ports 11–13. The SDC 700 is described with reference to FIGS. 5 and 6. It should also be apparent that the SDC 700, as a design choice, could be implemented as a single circuit coupled to the pairs 3–4 at each of the ports 11–12 via a multiplexor for sensing the signaling speed in turns.

First as an introduction, it is well known that a digital data signal can be encoded to include timing signals for timing functions. The timing signals are indicative of the frequency or speed at which the data signal is transported. For example, The 802.5 standard specifies Differential Manchester Encoding for the self-clocking timing signals of the data signals used in a token ring.

Figure 5:
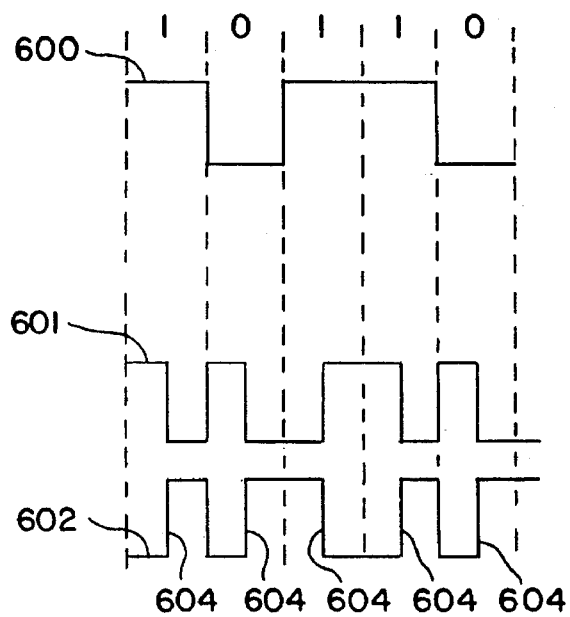
FIG. 5 is a timing diagram showing a data signal and a Manchester Encoded data signal.

FIG. 5 shows an example portion of a digital data signal 600 including a bit stream "10110." A logical 1 signalled as a relatively low signal, and a logical 0 being a relative low signal. The signals 601 and 602 are the Differential Manchester Encoded versions of the data signal 600. The signals 601–602 have signal transitions, from high to low, or from low to high, in the middle of each bit of transmitted data. These transitions, generally indicated by reference numeral 604, are the self-clocking timing signals of the data signal 600. Differential Manchester Encoded signals are typically generated by an exclusive OR function of a clock signal with the data signals.

Figure 6:
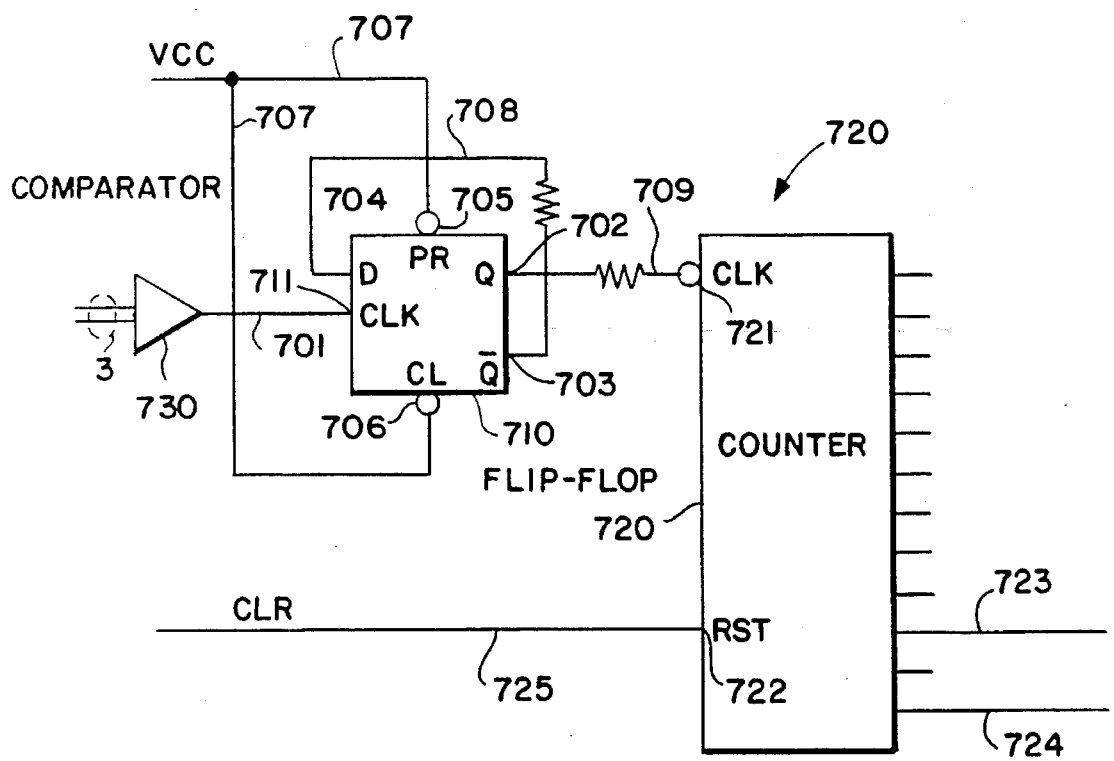
FIG. 6 is a logic diagram of a frequency or speed detection circuit.

FIG. 6 shows the frequency or "speed detection circuit" (SDC) 700 which is responsive to the signaling speed of a Differential Manchester Encoded signal as summarized above. The SDC 700 is used to determine whether the data signal presented at each of the ports 11–13 ports is signaling within prescribed frequency ranges. The circuit essentially operates as a signal extraction and divider circuit.

The SDC 700 includes a conventional flip-flop 710 coupled to a conventional counter 720. The flip-flop 710 is, for example, a "7474" dual type D positive edge triggered flip-flop. The counter 720 is, for example, a CMOS "4040" 12-bit counter. The SDC 700 receives as an input the data signal, e.g., a Manchester Encoded signal in the form shown in FIG. 5. The signal is received at a network port, for example, RO port 12 in FIG. 4. That is, the differential signals on the pair 3 at the port are connected, via conventional comparator 730, to the clock input 711 of the flip-flop 710 by line 701. The comparator 730 converts the dual signals on the pair 3 to a single digital signal on line 701.

The Q output 702 of the flip-flop 710 is connected to the clock input 721 of the counter 720 by line 709. The Q output 703 is connected to the data input 704 of the flip-flop 710 by line 708. The preset and clear inputs 705, 706 are tied "high" by lines 707.

The reset input 722 of the counter 720 receives a CLR signal via line 725. The CLR signal is a periodic signal derived from a system clock of the controller 160, not shown. The periodic frequency of the CLR signal is about 80 microseconds. The system clock operates at a frequency of 6.144 MHz, therefore 512 cycles of the system clock are used to time the frequency of the CLR signal.

The line 708 essentially provides a negative feedback loop for the flip-flop 710 to extract the self-clocking timing signals of the Manchester Encoded data signals on line 701 as a pulsed timing train on line 709. The frequency of the pulse train corresponds to the frequency of the incoming data signal on line 701. The pulse train causes the counter 720 to increment between the periodic CLR pulses on line 722.

The outputs 723 and 724 of the counter 720 indicate whether the input data signal on line 701 has either reached a low limit or a high limit during the period defined by the CLR pulses. The signals 723 and 724 are converted to software readable variables for use by the controller 160.

Now, again with reference to FIG. 4, the MAU controller 160 generates output signals for determining a next state of the TCUs, and for selectively driving phantom current over the network. Each of the TCUs 140–149 is responsive to the output signals generated by the controller 160 for transitioning the TCU between the inserted and wrapped states, see FIGS. 2 and 3 above. Therefore, the connectors at the ports 11–13, generally indicated by reference numeral 7, can be compact and low cost RJ45s.

The MAU 100 also includes Auto Wrap Enable (AWE) switches 171, 172, and 175 connected to the MAU controller 100 by lines 173, 174, and 176, respectively (note, only one of the lobe AWE switches 175 is shown in FIG. 4). The AWE switches 171, 172, and 175 are, for example, simple physical ON-OFF toggle switches, having an OFF state representing logical "0", and an ON slate representing logical "1." Alternatively, any of the AWE switches 171, 172, and 175 could be implemented as software controllable logical bits in the controller 160. The bits having a logical "0" or "1" value which can be set by commands communicated over the network.

The AWE switches 171, 172, and 175 provide compatibility with prior art dumb MAUs. That is, the AWE switches 171, 172, and 175 indicate whether phantom current trunk signaling, as described herein, is enabled for the respective ports 11–13. If the AWE switches 171, 172, and 175 are set to ON or 1, transitioning of the TCUs 140–149, as determined by the MAU controller 160, is enabled.

The AWE switches 171, 172, and 175 allow the smart MAU 100 to be connected to prior art dumb components that do not provide for trunk phantom current signaling, for example an IBM 8228 MAU. If the MAU 100 is connected, via any of the ports to a dumb MAU, the corresponding AWE switches 171,172, and 175 are toggled to OFF or 0.

If the MAU 100 is the only MAU in the network, the AWE switches 171–172 on the RI and RO ports 11–12 are set to ON or 1. In this case, the TCUs 140 and 149 will auto-wrap and the MAU 100 is essentially the trunk.

The general operation of the communications network is based on the concept that all network component, not only nodes 30 on lobes 20, but also MAUs 100 on a trunk 1, use phantom current signaling to control network configuration. In addition, speed detection is used on all port to ensure that data signals are propagated at valid and compatible frequencies.

With respect to phantom current signaling, the RI port 11 of the MAU 100 appears as a node or end-station to the upstream MAU. And, the RO port 12 of the MAU 100 appears as a lobe port to the RI port of the downstream MAU.

This scheme is implemented by the downstream component, for example the MAU 10 of FIG. 1, under the control of a MAU controller, such as the controller 160 of FIG. 4, sending a "request-to-insert" (RTI) control signal, via the trunk 1, to the upstream component. The RTI signal is a phantom current driven upstream out of the RI port 11. The upstream component, for example MAU 14 of FIG. 1, receives the RTI signal (e.g., phantom current) on its RO port 12. The upstream component inserts the RO port and the phantom current is returned downstream to the requesting component.

In accordance with this scheme, a network component is considered to be "active" while the component has a downstream network component inserted. A downstream component can be a node 30, or a MAU connected to the RO port 12. In other words, a ring component is active as long as it is receiving phantom current from a downstream component, and while the downstream component is operating at a compatible speed.

An "inactive" ring component is "wrapped" with respect to an upstream component. That is, an inactive ring component does not drive phantom current upstream until it requests to be inserted into the network. In effect, an inactive downstream component is wrapped out of upstream rings decreasing total signal loss on the network to improve performance.

A ring component automatically reverts to an inactive state when its power is removed, or if it fails. In other words, a ring component fails safe with the TCUs 140–149 in a wrapped state on a power failure. Thus, the upstream portions of a network are protected from localized downstream power failures. For example, the MAU 100 is implemented by making the TCUs 140 be of the type which are non-latching on power failure.

A network component prior to, and during network insertion must establish and maintain a valid data signaling speed. A network component should also protect the network by not permitting the insertion of components having an invalid speed. Speed detection is generally performed continuously. For example, the MAU 100 can detect speed changes at the Ring In port 11, thus, the MAU 100 is in a position to handle the problem of, for example, an upstream end-station or IBM 8228 suddenly changing its speed.

The proper insertion of a downstream component is generally managed as follows. An upstream ring component, for example the MAU 100, active or inactive, periodically samples for the presence of downstream phantom current on its lobe and RO ports. This sampling is done by the MAU controller 160. The presence of phantom current is synonymous with a request-to-insert by the downstream component. The period of sampling is, for example, every 10 milliseconds (ms). Phantom current is assumed to be present if it is correctly detected for five successive samples, that is 50 ms.

Not until after the upstream component detects a phantom current transition from OFF (0) to ON (1), does sampling for data signal speed (frequency) commence. And, only after valid speed is detected is the port inserted. Therefore, insertion of the TCU is effected after the upstream component detects both phantom current and a valid data signal speed.

The speed of the data signal is sampled periodically, for example, every 10 milliseconds. The sampled speed yields either a valid or an invalid speed. A speed is valid if it is between the slow and fast rates as indicated on lines 723 and 724 above. For example, for a 16 Mb/sec signal, the pulse train pulses should be in the frequency range of 6.14 to 18 Mb/sec. A 4 Mb/sec signaling speed is assumed if the train transitions are the frequency range of 1.5 to 5.6 Mb/sec. Transitions at any other rate are assumed to be an invalid signaling speed.

One additional factor is considered in the determination of whether or not a data signal has an acceptable speed. This factor is the quality of the data signal. The quality factor is derived from a plurality of successive samples. That is, if a large number of successive valid samples are detected, the signal is assumed to have a relatively high quality. If successive samples include invalid speed samples than the signal is of a relatively lower quality.

For example, when a port is wrapped, at least eight successive samples must be detected at a valid speed before the port state machine will transition the TCU from wrapped to inserted. In other words, the speed must remain stable for at least 80 ms before it is deemed valid at the time of initial insertion.

While a port is inserted, a lower quality factor is allowed to maintain the TCU in an inserted state. This lower quality is to compensate for loss of data signal on the network as components enter and leave the network. In other words, the quality standard is subjected to hysteresis, requiring a relatively high quality factor to effect TCU insertion, and allowing a lower quality factor of the data signal while the TCU is inserted.

For example, while inserted, only six out of the last eight samples need to be valid for a port to remain inserted. If more than three invalid samples are detected in the last eight samples, the port is wrapped. Thus, short term sporadic loss of data signal, as end-stations enter and leave the network, does not adversely effect the long term operation of the network. For example, sampling the port at a period which is greater than 5 ms permits the insertions of up to two additional ports during a particular 80 ms quality window, without causing the unnecessary wrapping of ports.

A different speed quality value is used to ensure the correct insertion of components which do not use the present phantom current signaling scheme, e.g. components connected at MAU ports where AWE=0. In a network constructed of components made by a variety manufacturers, speed oscillations may occur when the trunk is first activated after a power-on. Therefore, if the port has AWE=0, transition of a TCU from a wrapped to an inserted is not effected until the speed detected at the port has remained stable for at least 20 seconds. That is, the speed quality value for such ports requires 2000 successive samples at a valid speed to insert the corresponding TCU. It should be noted that the particular number of samples for insertion and wrapping are for practical illustration purposes.

Another challenge, which is solved by speed detection, occurs when the first end-station is inserted on a ring. Normally, an end-station derives or "recovers" the correct signaling speed from the incoming data signal. It is well known how to extract timing information, e.g., the self-clocking timing signals 604 described with reference to FIG. 5, from the data signal using filtering or phase lock looped circuits. Such an extracted signal is generally known as a "recovered" clock signal.

However, the first end-station on a ring has no incoming data signal from which to recover the self-clocking timing signal in order for it to determine its own correct signaling speed. Thus, the clocking signal of the first end-station tends to free-wheel between certain limits, and the data signal itself is generally wildly varying, due to the unstable data signal. Testing has shown that the speed of the data signal can be invalid for some time periods prior to the end-station re-synchronizing itself to an internal crystal controlled clock. The 802.5 standard specifies an 18 second time.-out period before the end-station is switched to its local oscillator.

Therefore, a delay, greater than 18 seconds, is imposed by the lobe state machine, after the first end-station has been inserted, during which invalid speeds are ignored. It is only after this delay period that end-station speed samples are analyzed. Subsequently, after the delay, and after the detection of eight valid speed samples is the RI port is allowed to drive phantom current upstream to insert the end-station. A suitable delay period is 20 seconds.

Where "AWE=0," for a port, i.e., ports with dumb components attached, the speed quality value of 2000, as described above, will ensure that the 20 seconds delay will already have elapsed. Therefore, end-stations connected at ports with AWE=0 can be insertion upstream immediately without any additional delay.

Speed detection is also used to establish a valid signaling frequency or speed for network components operating independently as an internal ring, that is external to the context of a network. Such a component is said to be operating as an internal ring. For example, MAU 100 is operating as an internal ring when no data are communicated via the RI and RO ports 11 and 12.

The internal ring speed (IRS) is defined as the valid signaling frequency or speed for an internal ring which is determined as follows.

First, the IRS for an internal ring can be set, in accordance with a crystal-controlled clock, to a predetermined speed. This predetermined speed, for example 4 or 16 Mb/sec, can be set to a default value at the factory, or by a particular software configuration of the MAU controller 160.

Second, the IRS of an internal ring can be determined by an "auto-bauding" method. When an internal ring is autobauding it is not signaling at any specific speed. Autobauding is a method whereby the IRS is determined by a majority "vote" of the TCUs attached to the internal ring. The majority rule makes the IRS deterministic, i.e., the IRS can be predicted based on the knowledge of the signaling speed of the components physically connected to the internal ring. If there is no clear majority, the RO port casts the deciding vote in order to determine the signaling speed of the internal ring.

This methodology overcomes a problem associated with the "first port" rule extant in prior art networks. With the "first port" rule, a particularly bad anomaly can occur. Suppose that the furthest downstream end-station is configured to operate at a low speed, for example 4 MB/sec, and that a majority of upstream components are configured to operate at a high speed, for example 16 MB/sec. Now, suppose that power is lost, and subsequently restored. If the low speed end-station is first to activate, it will force its low speed (4 Mb/sec) onto the MAU to which it is connected, and from there the low speed is propagated upstream onto the entire network, possibly locking out the majority of end-stations operating at a higher speed. To the user, the power glitch has "brought the network down."

Another problem with trunk speed detection occurs when a repeater, such as the repeater 50 of FIG. 1, is attached to the trunk 1, and no end-stations 30 are attached. The repeater 50 is then in a closed-loop feed-back situation generating highly unstable data signals on the trunk 1. Such unstable data signals can cause the detected speed to rapidly oscillate between valid and invalid values. In order to prevent rapid oscillation of the TCU relays between inserted and wrapped states, a delay period is maintained after an invalid speed is detected at a port, before another attempt is made to insert the TCU, thus reducing wear and tear on the TCUs while repeaters are propagating unstable data signals.

The functionality of the MAU controller 160 is provided by port state machines, one for each of the ports 11–13 and the corresponding TCUs 140–149. Each state machine, operating generally independently, transitions the various TCUs 140–149 according to corresponding sets of fixed rules which will be described in detail hereinafter.

Figure 7:
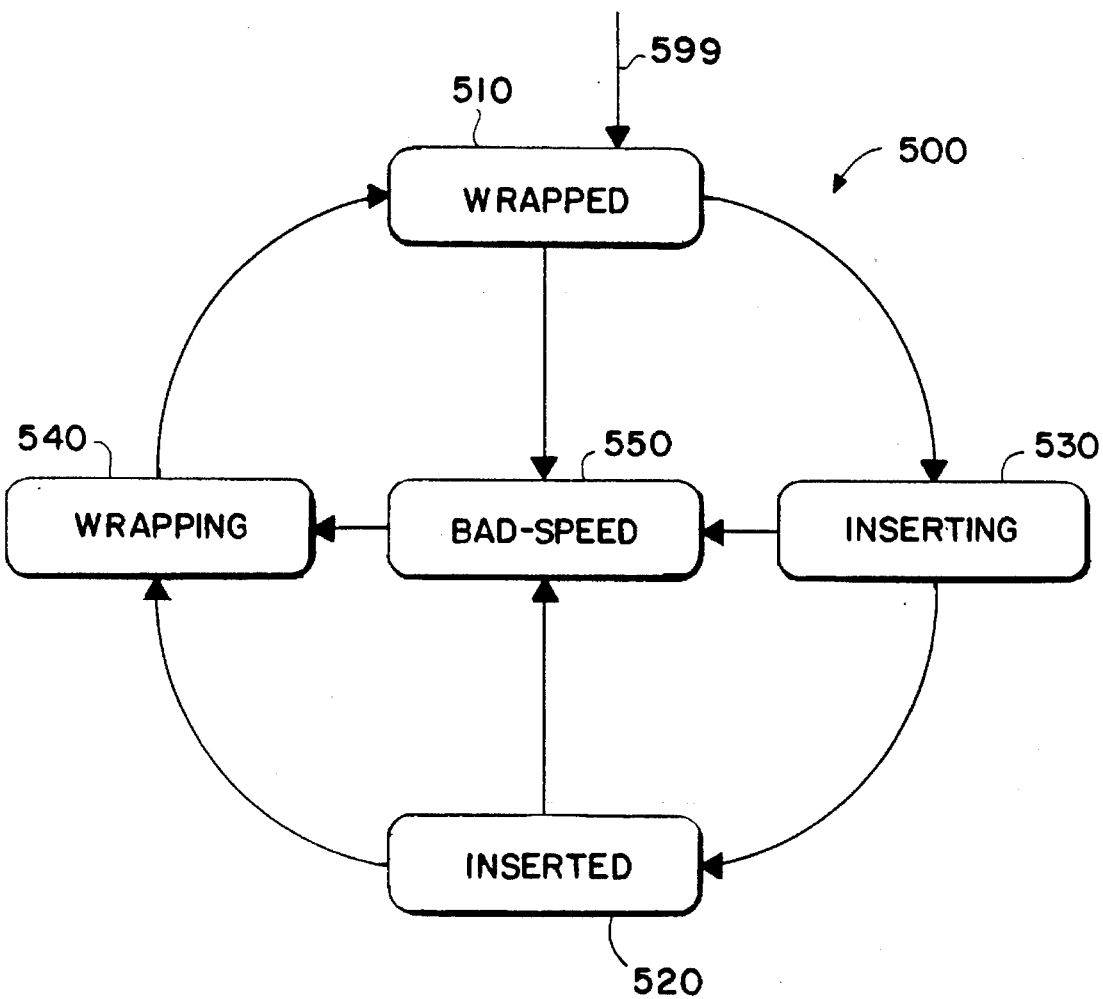
FIG. 7 is a state diagram of a port state machine.

FIG. 7 shows the general structure of a port state machine (PSM) 500. The primary states of the PSM 500 are a wrapped state 510, and an inserted state 520. The PSM 500 also includes secondary transitional states: an inserting state 530, a wrapping state 540, and a bad-speed state 550.

Upon power-up or hardware reset, generally indicated by reference numeral 599, the PSM 500 is forced into the wrapped state 510. In the wrapped state 510, the corresponding TCU controlled by the state machine 500 is wrapped as is shown in FIG. 3.

Communication is enabled when the PSM 500 is in the inserted state 520. When the PSM 500 is in the inserted state 520 the corresponding TCU is inserted as shown in FIG. 2. The rules which transition the PSM 500 between the wrapped state 510 and the inserted state 520 during the operation of the MAU 100 are described below.

The transitional inserting state 530 is used to provide a delay while the relays of the corresponding TCU are activated. The delay is long enough to eliminate any spurious signals generated by contact bounce of the TCU relays. While transitioning from the wrapped state 510 to the inserted state 520 the PSM 500 remains in the inserting state 530 for approximately 110 ms. Obviously, other delay periods may be appropriate for TCUs using relays of a different design.

The PSM 500 remains in the inserted state 520 while data signals are communicated through the TCU. That is, as long phantom current is present, and the speed of the data signal is valid.

If either the communications signals have the state where the phantom current is not present or the speed of the data signal is invalid, the PSM 500 eventually transitions from the inserted state 520 to the wrapped state 510. The wrapping state 520 has a similar purpose and latency as the inserting state 520.

The bad-speed state 550 allows the port state machine 500 to continue speed detection even though the speed detected at the port is invalid. Also, phantom current continues to be sampled and detected while a port state machine is in the bad-speed state. It follows, then, that when the detected speed becomes valid, insertion can be immediately effected. Furthermore, when a component signaling at an invalid speed is physically disconnected, phantom current is no longer detected, and state machine 500 transitions from the bad-speed state 550 to the wrapped state 540.

After entry into the bad-speed state 550, the state machine 500 will remain in the bad-speed state for at least 20 seconds. This delay prevents TCU oscillation possibly due to unstable data signals. After a 20 second delay, if the bad-speed condition still exists, the state machine will revert back to the wrapped state, via the wrapping state 540.

The bad-speed state 550 is used in part to provide compatibility with prior art ring components not capable of trunk phantom current signaling. For example, the RI port 11 may need to drive phantom current upstream to insert itself into the upstream portion of the ring controlled by the upstream "dumb" component. Data signals for speed detection will not be available until after upstream insertion.

Note, that the state machine 500 associated with the Ring In state machine, described below, will only enter the bad-speed state if its AWE=0. In a network controlled by trunk phantom current signaling, it is the responsibility of the upstream RO port to check for valid speed. While the Ring In port AWE=0, the Ring In state machine will enter the bad speed state 550 for any of the following conditions.

First, if the next immediately adjacent upstream component is operating at a valid but incompatible speed. For example, the upstream component is an IBM 8228 concentrator with active end-stations inserted at its lobe ports. The end-stations are signaling at a valid speed, but the speed is different than the speed used on this ring. The Ring In port state machine will remain in the bad-speed state until a compatible signaling speed can be established. Note, that in this case, the current MAU can operate independently to support the communication needs of downstream inserted components.

Second, the ring communications network is oscillating. When an inactive portion of the network is looped back onto itself, for example through a repeater, it is likely that invalid speed samples will be generated due to indeterminate and oscillating speed conditions on the ring. Therefore, the port state machine will generally stay in the bad-speed state until the speed is stabilized, for example, an active end-station is inserted on the repeated inactive ring.

Third, if the entire network is inactive. This condition may occur if no end-stations are active Anywhere on the network. In this case, there is no data signal from which to extract speed information.

Fourth, if there is no cable plugged in at the port, i.e., the ring is physically "broken." In this case, the TCU at the Ring In port stays mostly wrapped in order to maintain ring integrity. However, periodically, for example every 20 seconds, the state machine will attempt to insert and check for data signal at the Ring In port, generally indicative that the physical connection has been re-established.

The port state machines can be implemented with any conventional software or firmware running on, for example, an off-the-shelf microprocessor having sufficient memory to store the programs and variables required to express the state machine. Alternatively, the state machines, can also be implemented with hard wired logic circuits.

In the preferred embodiment, the state machines are implemented on a Motorola 64180 ("Z80") microprocessor having 32K of RAM, running programs coded in firmware.

The MAU controller 160 includes a plurality of lobe state machines (LSM), one for each of the lobe ports 13. The MAU controller 160 also includes a Ring Out state machine (ROSM) and a Ring In state machine (RISM) for the RO and RI ports, respectively. Each of these state machines includes states as described for the port state machine (PSM) 500 above. However, the inputs and outputs, and the rules which govern the transitions of these state machines are specifically designed for their respective state machines.

The operation of the specific state machines, LSM, ROSM, and RISM, are now described with reference to FIGS. 8–13.

The operation of the LOBE state machines (LSM) 400 of the MAU controller 160 for transitioning the TCUs 141–149 are described with reference to FIGS. 8–9. There is one independently controllable LSM 400 for each of the lobe ports 141–149.

Figure 8:
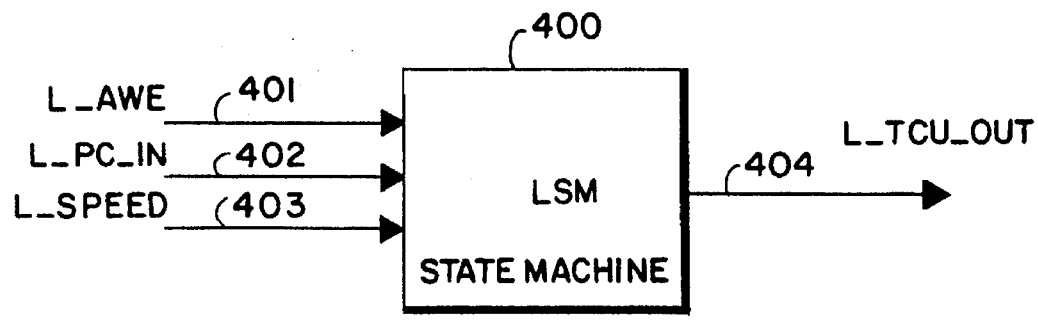
FIG. 8 is a block diagram showing the inputs and output of a lobe state machine.

As shown in FIG. 8 and 9, the LSM 400 has inputs:

An L-AWE signal 401 for indicating whether or not the down stream component is capable of generating phantom current. For example, if the downstream component is a dumb MAU which is connected at the lobe port via a self-shorting data connector L-AWE will have a value of OFF or 0. If the downstream component is a conventional end-station AWE will have a value of ON or 1. The L-AWE signal 401 is software controllable by, for example, network management during the operation of the MAU 100.

The L-AWE signal 401 is interpreted as:

x=ignore the detection of phantom current;

0=phantom current not required for TCU insertion; and

1=phantom current is required for insertion.

An L-PC-IN signal 402 for indicating whether or not phantom current is detected at the lobe port, where:

x=phantom current is ignored;

0=phantom current is not detected; and

1=phantom current is detected.

A L-SPEED signal 403 for indicating the data signal speed, on the lobe port, where:

x=data signal speed is ignored;

0=invalid data signal speed on the lobe port; and

1=valid data signal speed on lobe port.

The LSM 400 has an output:

A L-TCU-OUT signal 404 for transitioning the lobe TCU to a next state, where:

Wrap=wrap the lobe TCU; and

Insert=insert the lobe TCU

Figure 10:
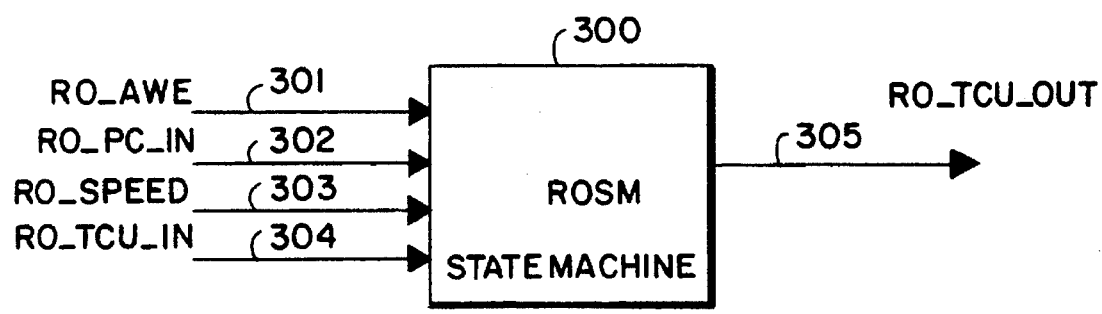
FIG. 10 is a block diagram showing the inputs and outputs of a Ring Out state machine.

The rules L1–L4 which govern the transitions of the states of the LSM 400 are shown in FIG. 10.

L-1: The downstream component connected at the lobe port is not capable of generating phantom current and it is signaling at an invalid speed, therefore, wrap the lobe TCU.

L-2: The downstream component does not require the detection of phantom current in order to effect insertion, however, since it signaling at a valid speed, insert the lobe TCU.

L-3: The downstream component does require the detection of phantom current in order to effect insertion, and it is signaling at a valid speed, however, phantom current is not detected, therefore, wrap the lobe TCU. This generally indicates that the downstream component is an inactive smart MAU.

L-4: The downstream does require the detection of phantom current in order to effect insertion. Phantom current and valid speed are detected, therefore, insert the lobe TCU.

The operation of the Ring Out State Machine (ROSM) 300 is described with reference to FIGS. 10–11. The operation of the ROSM 300 is similar to the operation of the lobe state machine 200. Generally, the ROSM 300 will attempt to insert the downstream component if phantom current is detected. In addition, the ROSM 300 controls the RO-TCU in such a way to mimic the self-shorting features of a data connector, without, of course requiring manual intervention.

As shown in FIGS. 10 and 11, the RISM 300 has inputs:

An RO-AWE signal 301 for indicating the ON-OFF position of the RI AWE Switch 171, where:

0=trunk phantom current signaling disabled; and

1=trunk phantom current signaling enabled.

A RO-PC-IN signal 302 for indicating whether or not phantom current is being received by RO port, where:

x=phantom current is ignored;

0=no phantom current received by the RO port; and

1=phantom current is received by the RO port.

A RO-SPEED signal 303 for indicating the data signal speed, where:

x=data signal speed is ignored;

0=invalid data signal speed on the RO port; and

1=valid data signal speed on RO port.

A RO-TCU-IN signal 304 for indicating the current state of the RO-TCU, where: Wrap=the RO-TCU is currently wrapped; and Insert=the RO-TCU is currently inserted.

The ROSM 300 has an output:

A RO-TCU-OUT signal 305 for transitioning the RO-TCU to a next state, where: Wrap=wrap the RI-TCU; and Insert=insert the RI-TCU.

The RO rules which govern the transitions of the ROSM 300 are described with reference to FIG. 12.

RO-1: The downstream component is not capable of trunk phantom current signaling, it is signaling at an invalid speed, and the RO-TCU is currently wrapped, therefore, leave the RO-TCU wrapped.

RO-2: The downstream component is not capable of trunk phantom current signaling, and it is signaling at an invalid speed, however, it is inserted, probably indicative of it being an idle backup ring, therefore, leave the RO-TCU inserted.

RO-3: The downstream is not capable of trunk phantom current signaling, and it is signaling at a valid speed, therefore, insert the RO TCU, whether or not it is wrapped or inserted.

RO-4: The downstream component is capable of trunk phantom current signaling, however, phantom current is not detected, therefore wrap the RO port since the downstream component is inactive. Note, the speed of the downstream data signal is not considered unless trunk phantom current is detected.

RO-5: The downstream is capable of phantom current signaling, and phantom current is detected, however, the downstream component is signaling at an invalid speed, therefore, wrap the RO-TCU.

RO-6: The downstream component is capable of trunk phantom current signaling, phantom current is detected, and the RO-TCU is inserted, however, the data speed is invalid. If the RO-TCU is already inserted it is left inserted even though the data speed is invalid. This rule handles the case where the downstream portion of the ring is inactive, that is, lacking a data signal for the purpose of speed determinations.

RO-7: The downstream component is cable of trunk phantom current signaling, phantom current is detected, and the data signal has a valid speed, therefore, insert the RO-TCU regardless of its current state.

The operation of the Ring In State Machine (RISM) 200 is described with reference to FIGS. 12–13. With respect to intelligent ring insertion, the operation of the RISM 200 is somewhat akin to that of an end-station. If the RISM 200 is operating in a network environment enabled for trunk phantom current signaling (AWE=1), insertion is accomplished by driving phantom current upstream. Otherwise, if the RI port is connected to a dumb upstream component (AWE=0), the RISM 200 automatically operates the RI TCU to mimic the self-shorting features of a data connector.

Figure 12:
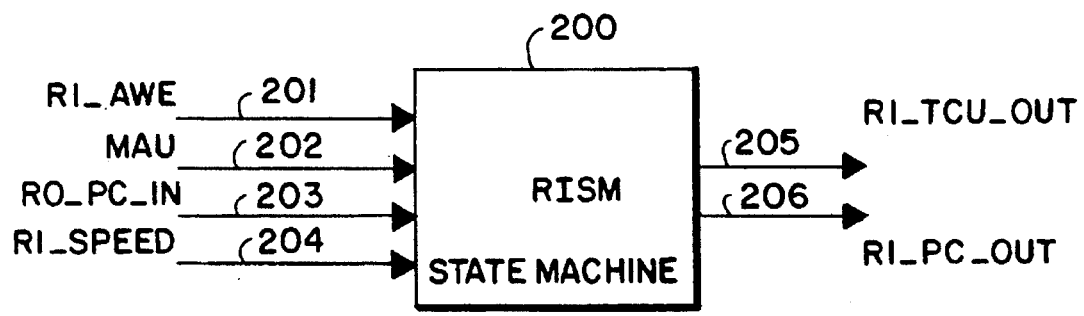
FIG. 12 is a block diagram showing the inputs and outputs of a Ring IN state machine.

As shown in FIG. 12 and 13, the RISM 200 has inputs:

An RI-AWE signal 201 for indicating the ON-OFF position of the RI AWE Switch 171, where:

0=trunk phantom current signaling disabled; and

1=trunk phantom current signaling enabled.

An MAU signal 202 for indicating the "active/inactive" state of the MAU, where:

x=MAU active state is ignored;

0=MAU inactive, no downstream TCUs are inserted; and

1=MAU active, at least one downstream TCU is inserted.

An RI-PC-IN signal 203 for indicating whether or not trunk phantom current is being returned at the RI port, where:

x=trunk phantom current is ignored;

0=trunk phantom current is not returned to RI port; and

1=trunk phantom current is returned to RI port.

A RI-SPEED signal 204 for indicating the data signal speed at the RI port, where:

x=data signal speed is ignored;

0=invalid data signal speed at the RI port; and

1=valid data signal speed at RI port.

The RISM 200 has outputs:

A RI-TCU-OUT signal 205 for transitioning the RI-TCU to a next state, where:

Wrap=wrap the RI-TCU; and

Insert=insert the RI-TCU.

In addition, the RISM 200 produces a RI-PC-OUT signal 206 for driving phantom current upstream out of the RI port, where:

0=no phantom current is driven upstream; and

1=drive phantom current upstream

FIG. 13 shows the rules 420 which are used to transition the RISM 200.

Where:

RI-1: The data signaling speed of the upstream component is invalid, therefore, wrap the RI-TCU, and do not drive phantom current upstream. This state of the RISM 200 is similar to a data connector being disconnected at the RI port. The RI TCU is maintained in a wrapped state for a period exceeding 18 seconds, after which the RI-TCU is briefly switched to the inserted state, at which time another determination is made to see if the data signaling speed is valid.

RI-2: The upstream components is not responsive to trunk phantom current signaling, however, it is signaling at a valid speed, therefore, insert the RI-TCU, but do not drive phantom current upstream. This state of the RISM 200 corresponds to having a data connector plugged in a the RI port. Note, in order to prevent oscillation of the RI-TCU relay, speed detection is done prior to TCU insertion. As is described above, the RISM 200 does not insert the RI-TCU unless 20 seconds of valid speed have been detected on the RI port.

RI-3: The upstream component is responsive to phantom current signaling, however, this MAU is inactive, therefore, wrap the RI-TCU and do not drive phantom current upstream. Note, that as an advantage, inactive MAUs are wrapped out of the network, thereby decreasing network signaling loss.

RI-4: The upstream component is responsive to phantom current signaling, and the MAU is active, therefore, insertion is being attempted by driving phantom current upstream. However, the phantom current is not being returned correctly by the upstream component, probably an indication of a wire fault on the circuit between this MAU and the next adjacent upstream MAU. Therefore, wrap the RI-TCU, and continue driving phantom current. For the return phantom current to be correctly detected, the D.C. voltage of the returned phantom current must be within prescribed limits, for example, as specified in the 802.5 standard. No phantom current return is usually indicative of on open or broken circuit on the upstream portion of the ring network.

RI-5: The upstream component is responsive to phantom current signaling, and the MAU is active, therefore, insertion is being attempted by driving phantom current upstream. Furthermore, the phantom current is being returned by the upstream component, however, the signaling speed is invalid, probably an indication of a MAU fault. Therefore, wrap the RI-TCU, and continue driving phantom current upstream.

Note, that for both RI-4 and RI-5 phantom current is driven upstream even though the RI-TCU remains wrapped. This corresponds to the state machine being in the bad-speed state 550 as shown in FIG. 7. During the bad-speed state, speed detection continues to be performed on the data signal received from the upstream component.

RI-6: The upstream component is responsive to phantom current signaling, and the MAU is active, therefore, insertion is being attempted by driving phantom current upstream, in addition, the phantom current is being returned by the upstream component, and there is a valid speed, therefore, insert the RI-TCU.

Note, when the MAU first becomes active, rules 4–6, the MAU should first attempt a "trial" insertion by driving phantom current upstream (RI-PC-OUT=1), without checking for valid speed. This is to accommodate the case where the upstream MAU is also a smart MAU checking the speed of this, the downstream MAU. During the "trial" insertion, the upstream incoming data signal is checked for speed. If the speed of the upstream MAU is not valid during "trial" insertion, the RI-TCU is forced to a wrapped state, continuing to drive phantom current upstream until a valid speed is detected.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. An apparatus for detecting signaling frequencies in a communications network, comprising:
    a token ring communications network, the token ring communications network including nodes for transmitting and receiving communications signals and a signaling medium for transporting the communications signals, the signaling medium including lobe circuits for connecting to the nodes and a trunk circuit having trunk segments for connecting to the lobe circuits in a ring configuration,
    a plurality of ports including an input port connected to an input trunk segment of said trunk segments, and an output port connected to an output trunk segment of said trunk segments, and a plurality of lobe ports connected to the lobe circuits;
    an internal trunk circuit for connecting said plurality of ports to each other;
    means, connected to each of said plurality of ports, for sensing a frequency of the communications signals at each of said plurality of ports; and
    a controller, connected to each of said means for sensing, said controller responsive to said frequency of the communications signals, sensed at each of said plurality of ports, said controller connecting a particular one of said plurality of ports to said internal trunk circuit, while said frequency of the communications signals at said particular port are within a valid predetermined frequency range.

2. The apparatus as in claim 1 wherein said means for sensing extracts frequency samples from the data signals at predetermined time intervals.

3. The apparatus as in claim 2 further including means for disconnecting said particular port from said internal trunk circuit if said first predetermined number of successive frequency samples at said particular port include more than a second predetermined number of frequency samples having a frequency outside said valid predetermined frequency range.

4. The apparatus as in claim 3 wherein said first predetermined number is eight and said second predetermined number is three.

5. A method for detecting signaling frequencies in a communications network, comprising:
    transmitting and receiving communications signals by nodes of the communications network, the communications network configured as a token ring;
    transporting the communications signals over a signaling medium of said token ring, the signaling medium including a plurality of lobe circuits for connecting to the nodes and a trunk circuit having trunk segments for connecting to the plurality of lobe circuits;
    connecting an input trunk segment of the trunk segments to an input port of a controller;
    connecting an output trunk segment of the trunk segments to an output port of said controller;
    connecting separately each one of the plurality of lobe circuits to one lobe port of a plurality of lobe ports of said controllers, said controller including an internal trunk circuit for connecting said input port, said output port and said plurality of lobe ports to each other;
    sensing a frequency of the communications signals at said input port, said output port and said plurality of lobe ports as frequency samples;
    classifying each of the communications signals as a valid communications signals or as an invalid communications signals, said valid communications signals having the frequency samples within a permitted frequency range, and said invalid communications signals having the frequency sample outside said permitted frequency range; and
    connecting said input port, or said output port, or said plurality of lobe ports to said internal trunk circuit if the communications signals at said input port, or said output port, or said plurality of lobe ports are designated as said valid communications signals.

6. The method as in claim 5 further including the steps of
    grouping a plurality of successive ones of said frequency samples into a group,
    counting the number of said valid samples and counting the number of said invalid samples in said group to determine a relative quality of said communications signals, said relative quality of said communications signals proportional to the number of said valid frequency samples and the number of said invalid frequency samples in said group,
    designating the communications signals said valid communications signals if the number of said valid frequency samples is greater than a first predetermined number, and
    designating the communications signals as said invalid communications signals if the number of said invalid frequency samples is greater than a second predetermined number.

7. The method as in claim 6 further including the step of disabling the connection of of said input port, said output port, or said plurality of lobe ports to said internal trunk circuit if respectively, said frequency of the communications signals at said input port, or said output port, or any of said plurality of lobe ports is substantially different than said frequency of the communications signals at said input port.

8. A method for detecting signaling frequencies, comprising:
    transmitting and receiving communications signals by nodes of a token ring communications network;
    transporting the communications signals over a signaling medium, the signaling medium including a plurality of lobe circuits for connecting to the nodes, each of the plurality of lobe circuits for connecting to one of the nodes, and a trunk circuit having trunk segments for connecting to the lobe circuits; connecting an input trunk segment of the trunk segments to an input port of a controller;
    connecting an output trunk segment of the trunk segments to an output port of said controller;

connecting separately each one of the plurality of lobe circuits to one lobe port of a plurality of lobe ports of said controller;

sensing, respectively, a frequency of the communications signals at said input port, said output port, and said plurality of lobe ports as frequency samples;

classifying each of said frequency samples as valid samples or as invalid samples, said valid samples having a first frequency within a permitted frequency range and said invalid samples having a second frequency outside said permitted frequency range;

designating the communications signals as valid communications signals if the number of said valid samples of the communications signals is greater than a first predetermined number;

designating the communications signals as invalid communications signals if the number of said invalid samples of the communications signals is greater than a second predetermined number;

connecting, respectively, said input port, or said output port, or any of said plurality of lobe ports to an internal trunk circuit of said controller if, respectively, the communication signals at said input port, or said output port, or any of said plurality of lobe ports are designated as said valid communications signals, said internal trunk circuit for connecting said input port, said output port, and said plurality of lobe ports to one and another; and establishing an internal signaling frequency of said internal trunk circuit, said internal signaling frequency being substantially the same as said frequency sensed at a majority of said input port, said output port, and said plurality of lobe ports.

9. The method as in claim 8 further including the steps of if there is no majority of said plurality of ports having the same frequency, establishing said internal signaling frequency of said internal trunk circuit the same as said frequency sensed at said input port.

10. A method for detecting signaling frequencies of communications signals of a communications network, comprising:

connecting a token ring to a multi-access unit, the multi-access unit having a plurality of ports and an internal trunk, said plurality of ports including an input port connected to an input segment of the token ring, an output port connected to an output segment of the token ring, and a plurality of lobe port connected to lobe circuits of the token ring, said plurality of ports for providing signaling continuity of the token rings, and said internal trunk for connecting said plurality of ports to each other;

sensing a frequency of the communications signals at each of said plurality of ports;

determining if said frequency of the communications signals sensed at each of said plurality of ports is within a valid permitted range of frequencies; and enabling, in response to said frequency being within said valid permitted range of frequencies, signaling continuity between the token ring and said internal trunk via any of said plurality of ports having said frequency within said valid permitted range of frequencies.

11. The method of claim 10 further including:

establishing said frequency of said internal trunk circuit to a majority frequency, said majority frequency being said frequency detected at a majority of said plurality of ports.

* * * * *